United States Patent [19]

Kuehnle

[11] 4,297,919
[45] Nov. 3, 1981

[54] MECHANICAL POWER TRANSMISSION METHOD AND MEANS

[76] Inventor: Manfred R. Kuehnle, 6 Linmoor Ter., Lexington, Mass. 02173

[21] Appl. No.: 31,469

[22] Filed: Apr. 19, 1979

[51] Int. Cl.³ .......................... F16H 3/44; F16H 1/18
[52] U.S. Cl. .................................. 74/750 R; 74/409;
74/424.5; 74/424.8 C; 74/427; 74/461; 74/465
[58] Field of Search .................. 74/750 R, 785, 788,
74/409, 410, 411, 415, 424.5, 424.8 C, 425, 427,
449, 461, 465

[56] References Cited

U.S. PATENT DOCUMENTS

| | | | |
|---|---|---|---|
| 26,476 | 10/1859 | Kuehnle | 74/424.5 |
| 1,586,285 | 5/1926 | Burke | 74/750 R |
| 1,611,630 | 12/1926 | Burke | 74/750 R |
| 2,888,833 | 6/1959 | Toderick | 74/449 X |
| 3,174,354 | 3/1965 | Kuehnle | 74/424.5 |
| 3,597,990 | 8/1971 | McCartin | 74/415 |
| 3,820,413 | 6/1974 | Brackett | 74/415 |
| 3,945,778 | 3/1976 | Zimmern | 74/425 |
| 4,127,041 | 11/1978 | Imazaike | 74/461 |

FOREIGN PATENT DOCUMENTS

| | | | |
|---|---|---|---|
| 176798 | 11/1906 | Fed. Rep. of Germany | 74/750 R |
| 2421836 | 11/1975 | Fed. Rep. of Germany | 74/425 |
| 602233 | 12/1925 | France | 74/415 |
| 245167 | 9/1945 | Switzerland | 74/461 |
| 513578 | 10/1939 | United Kingdom | 74/750 R |

Primary Examiner—Lawrence J. Staab
Attorney, Agent, or Firm—Cesari and McKenna

[57] ABSTRACT

A particularly compact and efficient transmission includes one or more helix-like races having a common axis of rotation, a support member extending along the axis, one or more bearing units axially fixed to the support member and with their peripheries positioned in rolling engagement with the races, and means for rotating the bearing units about the axis whereby the bearing units roll along the races and the support member advances along the axis. Each bearing unit includes a hub, a circular array of roller means located radially outward from the hub, and resilient means for rotatively connecting each roller to the hub so that each roller is stiff in the circumferential directions around the array, but relatively elastic in planes which include said axis hub. When the transmission is under load, the roller means deflect laterally as needed to achieve uniform contact between all roller means and their respective race walls so that the load is distributed uniformly among all of the bearing units.

18 Claims, 8 Drawing Figures

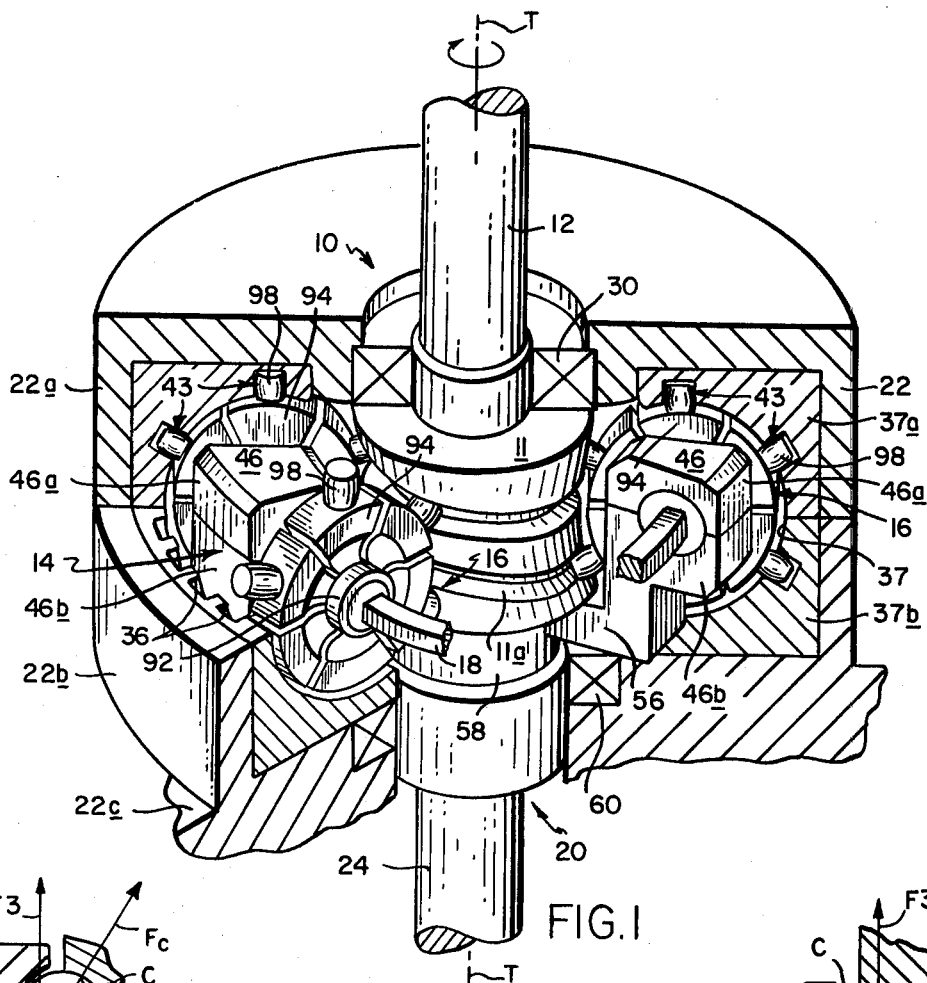
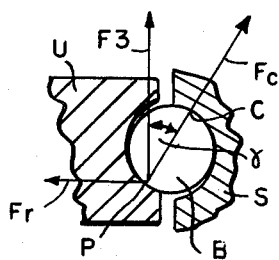
FIG.6A
PRIOR ART
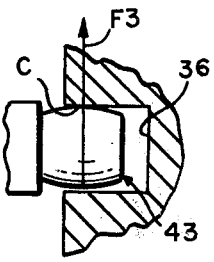
FIG.6B
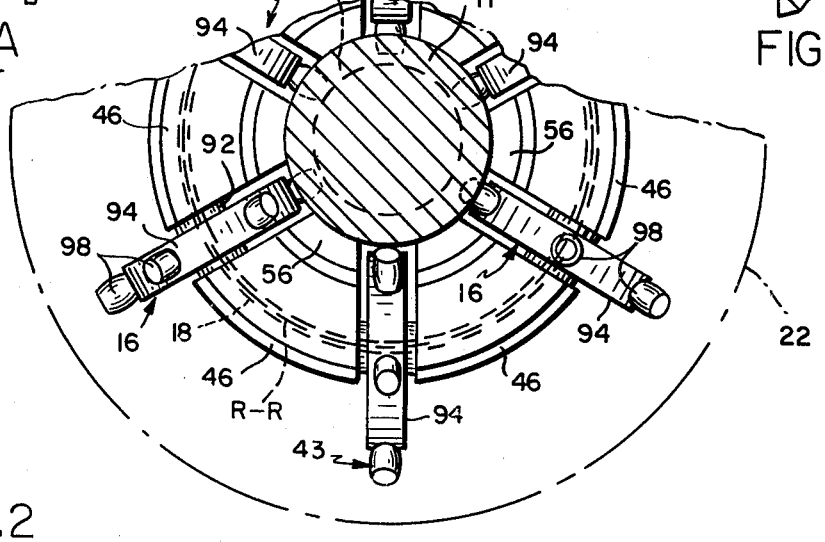
FIG.1
FIG.2

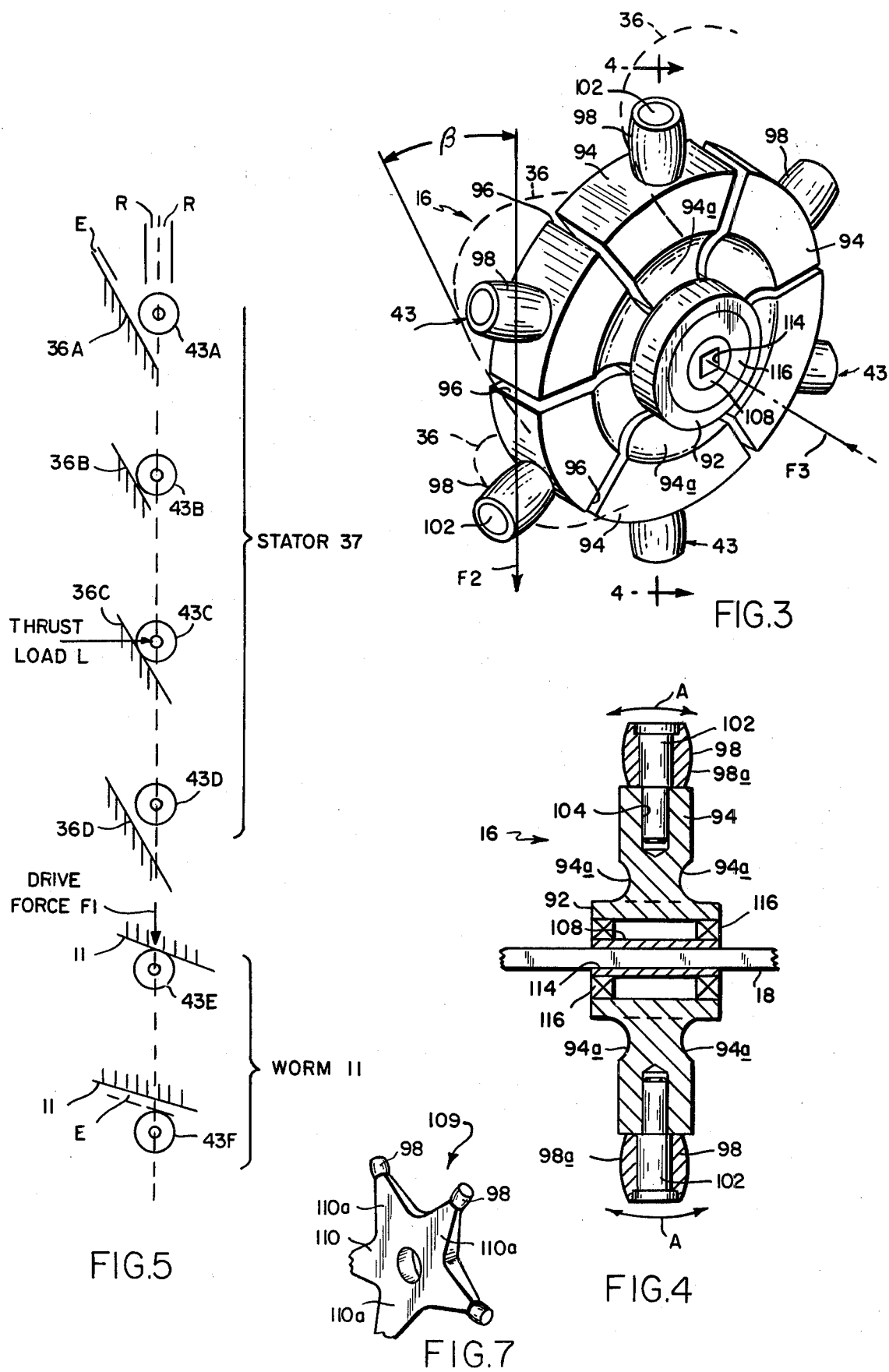

MECHANICAL POWER TRANSMISSION METHOD AND MEANS

This invention relates to a mechanical power transmission. It relates more particularly to a power transmission of the type including a drive worm, a multiplicity of planetary gear elements positioned in a housing containing a multiplicity of guide grooves usually arranged in the form of a toroid. The transmission couples torque between the drive worm and an output shaft projecting from the housing.

BACKGROUND OF THE INVENTION

The torque and power handling capability of any gear transmission is limited primarily by the number of teeth, the strength of the teeth and the Hertz pressures which become active during the conveyance of motion and power from the input to the output side of the transmission. In a typical spur gear transmission, only one pair of teeth is engaged at any time. On the other hand, planetary gears of the general type of interest here typically divide the flow of power over three or more sets of gear teeth. In the latter type transmission, the more teeth that are engaged, the more critical the manufacturing tolerances have to be in order to assure simultaneous and equally loaded contacts for all gear teeth in the different sets. Thus the structural rigidity and dimensional aberrations prevailing with the interlocking gear elements in a transmission determine ultimately the number of teeth which are actively engaged at any given time. This limitation is well known for planetary gears as well as for worm gears. To applicant's knowledge, however, that problem has not been alleviated in the case of the toroidal transmissions of the type with which we are concerned here.

Toroidal transmissions have been known for some time. In one such transmission disclosed in my U.S. Pat. No. 3,174,354 the grooves are in the form of slits which guide strip-like gear elements. Those gear elements require spokes to support the strips which must twist to accommodate the varying lead angles of the grooves in which the gear elements slide, whereas for meaningful torque transmission, those spokes should be stiff and strong in that direction to carry the load. Resultantly, that type transmission is only useful as a motion transducer, for example, to turn the hands of a clock. It does not have any real ability to transmit torque or drive a heavy load.

In other transmission of this general type shown in my U.S. Pat. No. Re. 26,476, the grooves in the housing have a circular or gothic arch profile for the purpose of guiding gear elements in the form of circular ball bearing units. Those bearing units are rigid so that there is no means to distribute the load among the gear elements without imposing excessively tight tolerance requirements on the diameters and other dimensions of the drive worm and stator, as well as on the diameter of the mounting ring required to support the bearing units. As a practical matter, because of inevitable dimensional variations, even if all the teeth on the bearing units are carefully honed to minimize pressure points between the teeth and the races, it is next to impossible to assure simultaneously an equally loaded contact for all the bearing units in the transmission. Rather, the load is concentrated essentially on one bearing unit so that advantages of high efficiency, long transmission running life and small overall size and weight are not attained. Rather, the transmission must be overdesigned for its particular end use.

In fact, it is a characteristic of all prior gear systems of which I am aware, particularly planetary systems, that the gear elements have rigid teeth ostensibly to maximize their load carrying capabilities. Therefore, they all share those very same problems.

My prior transmission is disadvantaged also because the teeth of each bearing unit ride in different stator races or grooves. For example, if each unit has twelve teeth, twelve different grooves are required. In that event, a given tooth runs in groove convolutions 1, 12, 24, 36, 48, 60, 72, 84, 96, 108, 120, 132, 144. Thus the ratio is divided into 144/12. The angular spacing between the bearing units to achieve this result is fixed as described in that patent. Likewise, if the units each have six teeth, six grooves are required yielding a ratio divided into 72/6. In other words, the reduction ratios available with that prior drive are limited because of the assumption that the number of stator grooves and the number of teeth must divide evenly.

SUMMARY OF THE INVENTION

Accordingly, the present invention aims to provide an improved toroidal transmission.

Another object of the invention is to provide a toroidal transmission which has a long running life.

A further object of the invention is to provide a toroidal transmission of dramatically reduced size which yields a large torque output.

Yet another object is to provide such a transmission which can be suited to a particular application by changing only a relatively few parts.

Still another object of the invention is to provide a transmission of this type which is relatively economical to manufacture because it does not require extremely tight manufacturing tolerances.

Yet another object of the invention is to provide a toroidal transmission which is relatively light weight which also is reflected in a significant cost reduction.

Still another object is to provide a transmission which is relatively easy to manufacture.

A further object of the invention is to provide such a transmission which is quiet running and relatively insensitive to shocks.

Another object is to provide such a transmission having a wide selection of reduction ratios.

A further object of the invention is to provide a toroidal transmission having a relatively high reduction ratio, yet which is reversible.

A further object of the invention is to provide a highly efficient toroidal transmission.

Another object is to provide a method of making a transmission having one or more of the foregoing advantages.

Other objects will, in part, be obvious and will, in part, appear hereinafter.

The invention accordingly comprises the features of construction, combination of elements, arrangement of parts and series of steps which will be exemplified in the following detailed description, and the scope of the invention will be indicated in the claims.

Briefly, the present transmission comprises a housing which defines one or more helical stator races or grooves with the convolutions of each race usually formed "parallel" to one another and having a common circular axis. Positioned in the housing are a plurality of similar planet gears rotatively mounted at spaced-apart locations around a ring which is coincident with the circular axis of the stator grooves. The radially outboard "teeth" of the planetary gears engage in the stator grooves, each such engaging tooth of each such gear extending into a different one of said groove convolutions. The radially inboard teeth of the planetary gears engage a worm rotatively mounted in the housing at the center or axis of the ring and circular axis of the stator grooves, the stator grooves being interrupted to accommodate the worm.

The worm is formed with one or more parallel races or grooves so that the teeth of each planetary gear which engages the worm engages in a race. The transmission input shaft is connected to one end of the worm, its opposite end extending out of the housing. The transmission output shaft is connected at one end to the ring supporting the planetary gears, the opposite end of that shaft also extending out of the housing. In a general sense only, then, the present toroidal transmission is similar to the one disclosed in my U.S. Pat. No. Re. 26,476.

The present transmission differs from my prior one, however, in several critically important respects. First, I have discovered that the teeth on the bearing units do not have to run always in the same groove upon successive revolutions around the stator as is the case in my prior transmission. Furthermore, the planetary gears or bearing units do not each require teeth and teeth gaps of equal angular width. This means that the number of different grooves in the stator does not have to relate strictly to the number of teeth on each bearing unit. Rather, any number of grooves can be used so long as the wall thickness between the last groove convolution and the first is the same as that between the other groove convolutions. Consequently, unlike a transmission such as the one disclosed in my prior patent, which demands equal pitch for stator groove and bearing unit tooth, the present transmission can have thin walls or thick walls between stator groove convolutions depending upon the reduction ratio required for the particular application. The thicker the walls, the larger the reduction ratio, while the tooth and groove width can remain the same. Changing the gear ratio simply involves substituting a stator of equal diameter having different groove wall thickness and moving the planets into different mounting positions on ring 18.

This feature applies equally well to the worm so that the pitch of its grooves does not have to be related strictly to the angular spacing between the bearing unit teeth. This flexibility permits even greater selection in the reduction ratio of the transmission.

The present apparatus differs from my prior one also in that each planetary gear comprises a bearing unit composed of a circular array of radial beams or spokes which radiate out from a central hub. The spokes are formed so that they are individually relatively flexible in the planes which include the axis of the bearing unit, but quite stiff in the circumferential direction around the bearing unit. Preferably the bearing unit teeth comprise a circular array of pins or rollers rotatively mounted to the outer ends of the beams or spokes. Each roller is mounted with its axis coincident with the radial beam axis, there being one roller secured to each spoke.

When the planetary gears and worm are properly assembled in the housing, as few as one roller on each bearing unit may engage in a stator groove, the remaining rollers of that unit sitting near the guide surfaces of their respective grooves. Thus, when torque is applied to the transmission input shaft under a minimal or no-load condition, only one tooth of each bearing unit may be engaged in a stator groove and actively carry any such load. However, as the load is increased and the transmission torque attains its peak design value, the beam or spoke supporting that first engaging roller as well as every single other spoke in the bearing unit may deflect sideways, i.e. perpendicular to the plane of the bearing unit, as necessary until absolutely all teeth contact their respective guide surfaces and thus share equally the thrust force. In other words, literally all of the planetary gear teeth actually reposition themselves elastically laterally as needed to compensate for the dimensional tolerance variations in the transmission parts.

As noted above, while the planetary gears or bearing units are flexible laterally, they are very stiff in the circumferential direction around the unit. Consequently the rotational moments exerted on the planetary bearing units by the centrally located worm are all substantially the same. Therefore the motions of all of the bearing units are substantially uniform. Resultantly, all teeth of the planetary gears additively share the total transmission load.

Also, in order to maintain uniform contact pitch lines for all of the bearing units in all of the stator grooves and also to minimize the Hertz pressures on the contacting surfaces of the bearing units and stator despite the varying amounts of lateral deflection of the different bearing units, the stator grooves are formed with generally rectangular cross-sections and the bearing unit rollers are slightly barrel-shaped (e.g. a few thousandths of an inch) as will be described in more detail later.

Thus the present toroidal transmission is treated as a complete dynamic and kinematic system. The elasticity of the entire assembly, and particularly of each bearing unit, is calculated to achieve equal load sharing for typically 50% of the load on upwards to maximum load. Further, the total amounts of deflection of the bearing unit spokes, the shock absorption capability of the parts, as well as the dynamic resonance properties of the transmission are all taken into consideration when designing the transmission for a specific end use. If the torque carrying requirements of the transmission vary, this may be compensated for simply by substituting bearing units having different elastic properties suited to those different requirements.

It should be understood, however, that in all cases, the transmission is designed so that all of the bearing unit rollers share additively in the total load so that a transmission of given torque capacity can be made to have minimum overall size and weight. Moreover, with the present transmission, the more torque, the better the distribution of load and the quieter the operation of the transmission. This effect is exactly the opposite of the situation which prevails in all prior transmissions of this general type of which I am aware. In fact, I daresay that this is the first gear system of any kind which has a selective intrinsic elasticity specifically matched to the torque that the system is intended to carry so that a system of minimum size and weight can drive a maximum load.

BRIEF DESCRIPTION OF THE DRAWINGS

For a fuller understanding of the nature and objects of the invention, reference should be had to the following detailed description taken in connection with the accompanying drawings, in which:

FIG. 1 is a perspective view partly broken away of a toroidal transmission embodying the principles of this invention;

FIG. 2 is a fragmentary top plan view of the transmission with parts broken away;

FIG. 3 is a perspective view on a larger scale illustrating a part of the FIG. 1 transmission in greater detail;

FIG. 4 is a sectional view along line 4—4 of FIG. 3;

FIG. 5 is a schematic diagram illustrating the operation of the FIG. 1 transmission;

FIG. 6A is a diagrammatic view showing the forces exerted on a gear tooth in a prior transmission of this general type, FIG. 6B is a similar view illustrating those forces in the FIG. 1 transmission, and FIG. 7 is a perspective view of a modified form of bearing unit for use in the FIG. 1 transmission.

DESCRIPTION OF AN ILLUSTRATIVE EMBODIMENT

Referring first to FIG. 1 of the drawings, the present transmission comprises an input section indicated generally at 10, including a worm 11 formed on a rotary shaft 12. Input section 10 is coupled to an intermediate section indicated generally at 14 comprising an array of planetary ball bearing units 16 in engagement with worm 11 and rotatively mounted at spaced apart locations on a shaft or support member usually taking the form of a circular ring 18 having a square cross-section. Finally, the transmission also includes an output section 20 composed of a helically grooved housing indicated generally at 22 and an output shaft 24 journalled within the housing 22 and connected to the ring.

The housing 22 comprises a pair of separable upper and lower sections 22a and 22b which are secured together by bolts (not shown) extending through appropriate holes in the housing sections. The lower housing section 22b includes a flange 22c containing an array of screw holes (not shown) for mounting the transmission on a stable base. The input to the transmission is applied by way of rotary shaft 12 and the output is taken from rotary shaft 24 which rotates relative to the housing 22 about a common axis T—T (FIG. 1) which we shall define as the axis of translation. The input shaft 12 is journalled for rotation within housing 22 and bearings 30 positioned on the shaft immediately above and below worm 11 and it has a reduced diameter portion (not shown) rotatively supported by the output shaft 24.

In the intermediate section 14, the ring 18 or more particularly, the rotation axis R—R is coaxial with shaft 12 and the planetary bearing units 16 extending radially outward from the points where they engage in the grooves or races 11a in worm 11. In the illustrated embodiment, each bearing unit has a peripheral array of six teeth 43. Those teeth 43 facing worm 11 interfit therewith so that rotation of the worm in one direction or the other causes corresponding rotation of the bearing units 16 in unison about the circular access R—R (FIG. 2) of ring 18 which we shall define as the axis of rotation. In the illustrated embodiment, the bearing units 16 are also arranged to roll in an assemblage of six parallel, helix-like grooves or races 36 inscribed in a toroidal enclosure 37 composed of upper and lower sections 37a and 37b removably positioned within housing 22. In this example, the races form in essence a multiple thread system which is interrupted in the area facing the worm 11. Thus they turn back on themselves to form six continuous paths for the bearing units 16.

As with my prior toroidal transmission, the teeth 43 of each bearing unit 16 can ride in different ones of the races 36. Thus the six races 36A to 36F inscribed in enclosure 37 may accommodate the six teeth 43A to 43F on each bearing unit 16. In that event as shown in FIG. 5, at any given time, four of the teeth, say, teeth 43A to 43D engage in stator grooves, e.g. grooves 36A to 36D while two of the teeth, e.g. teeth 43E and 43F engage worm 11. When a bearing unit 16 is rotated about ring 18 so that its four teeth 43A to 43D within enclosure 37 move up in their corresponding races 36A to 36D, the entire bearing unit is moved in one direction about the translation axis T—T corresponding to the common axis of shafts 12 and 24. On the other hand, if the teeth move down in their respective races, the bearing unit is displaced in the opposite direction about that axis. Thus as each bearing unit 16 advances around enclosure 37, each of its six teeth follows a helix-like path engaging in every sixth groove convolution formed in the enclosure 37.

Further, as the worm 11 (FIG. 1) turns in one direction or the other, it rotates the bearing units 16 in unison by engaging two balls of each bearing unit. The rotating bearing units move in one direction or the other along races 36 and are thereby displaced around the enclosure 37.

Referring to FIGS. 1 and 2, the planetary bearing units 16 are distributed around the ring 18 and axially fixed thereto by a set of wedge shaped spacer clamps 46. In the illustrated transmission composed of six bearing units, there are likewise six clamps 46. Each clamp comprises an upper section 46a and a lower section 46b which clamp together around ring 18, the two clamp sections being held tightly together by bolts (not shown). Power takeoff from ring 18 is achieved by means of L-shaped arms 56 connected between the lower clamp sections 46b and an enlarged diameter portion 58 of output shaft 24. The shaft portion 58 is journalled in housing 22 by way of a bearing 60. As mentioned previously, the input shaft 12 is rotatively mounted in shaft 24. Accordingly, the inner end of shaft portion 58 is provided with a vertical well (not shown) for receiving the reduced diameter portion of shaft 12 and its lower bearing 30.

Thus when the worm 11 turns in one direction or the other, it rotates the bearing units 16 in unison about rotation axis R—R by engaging two balls of each bearing unit. The rotating bearing units, in turns, move in one direction or the other along races 36 and are thereby displaced around enclosure 37 about the translation axis T—T. Since the bearing units 16 are axially fixed to ring 18 by clamps 46 they carry the ring with them causing the ring and the clamp to revolve about worm 11 within housing 22. As the clamps revolve, so too does the output shaft 24 connected to those clamps by arms 56. Consequently, since the transmission is epicyclic in nature there is a two fold gear reduction $I_t$, as follows:

$$I_t = I_w \times I_r \pm 1 \qquad (1)$$

where:

$I_w$ = ratio of the number of worm grooves to the number of planet teeth, and $I_r$ = ratio of the number of planet teeth to the number of stator grooves By way of example, the pitches of the worm and stator grooves may be such as to require six turns of worm 11 for each rotation of bearing units 16 about ring 18 and six revolutions of the bearing units about the stator for each turn of ring 18 and output shaft 24 relative to the housing 22, providing a nominal total gear reduction of 36±1/1. If the worm and stator groove lead angles are in the same direction and the input is via the worm, the ratio is 37:1. If, however, the stator is rotated and the output taken from the worm, the ratio becomes 35:1. If the worm and stator lead angles are in the opposite direction, the above ratios are reversed.

It has been assumed in the aforesaid discussion that, as in my prior transmission, the teeth of each bearing unit 16 must ride in different stator grooves 36A to 36D so that the number of grooves and teeth must divide evenly. With that assumption, the reduction ratios available from the transmission are quite limited. However, my discovery that such a relationship does not have to exist now permits a wide selection in the ratios obtainable.

More particularly, the toroidal enclosure 37 can be formed with, say, a single groove or race 36 of a given pitch which groove continues around and around the enclosure with the groove convolutions in the second and succeeding revolutions of the same groove 36 about the stator being interlaced. The only requirement is that the wall thickness between the last and first groove convolutions be the same as that between all other convolutions. With this arrangement, a particular tooth on a bearing unit which initially runs, say, in the first groove 36 convolution on the first revolution of that unit about the stator, may, on the second revolution, run initially in the second groove 36 convolution. Likewise, the remaining teeth in that unit will run in successive convolutions upon successive revolutions of the bearing unit about the stator. Also, unlike prior gears, such as spur gears for example, requiring teeth and teeth gaps of equal angular spacing, bearing units 16 are not so constrained. Thus it is now apparent that a variety of different reduction ratios may be obtained from the same transmission simply by changing the wall thickness between the convolutions of the single groove 36 which changes the pitch of the groove. The widths of the grooves and bearing unit teeth can, of course, remain the same and, most importantly, so does the diameter of the stator. The retention of the same diameter stator permits the standardization of components. Unlike other gears or even my previous transmission, it is now possible to achieve different ratios and yet retain the same diameter stator, the same worm and the same planets. This change is accomplished easily by substituting different enclosure sections 37a and 37b in housing 22 which sections may have groove wall thicknesses of from ¼ inch to as much as 2 inches to achieve widely different reduction ratios with the very same basic transmission.

This same principle can be applied to worm 11 within limits. Thus, for example, instead of using a multiple thread system on the worm, a single thread may be employed. Indeed, the worm can be provided with less than one full thread per revolution so that it has, say, one-half the pitch of the bearing unit teeth yielding for a six tooth bearing unit a reduction ratio of 6/1×2/1 or 12:1. Normally, for most applications the worm will have from one to six threads. In actual practice, the present transmission can easily cover the following ratio ranges: $I_w = 1/6, 2/6, 3/6 \ldots 6/6$ and $I_r = 6/36, 6/37, 6/38 \ldots 6/120$. From Equation 1, it is seen that this yields a total ratio $I_t$ which may thus range all the way from 1/6 min. . . . 1/240 max.

The present transmission departs radically from my prior one also, in the design of the bearing units 16 and in the configuration of the stator and worm grooves. More particularly and referring particularly to FIGS. 3 and 4, each bearing unit 16 comprises a generally cylindrical hub 92 from which radiate a circular array of radial wedge-shaped spokes or beams 94, each spoke being separated from its neighbor by a narrow radial slot 96 which extends from hub 92 to the perimeter of the spoke array. The illustrated bearing unit 16 has six such spokes and six such slots. Centered on the outer end of each spoke is a stationary pin or, more preferably, a roller 98. Each roller is rotatively secured to the end of its spoke by a machine bolt 102 countersunk into the outer end of the roller and turned down into a threaded passage 104 in the spoke. As best seen in FIG. 4, the outer surface 98a of each roller is slightly barrel-shaped for reasons that will become apparent presently. In the drawing figures, that shape has been exaggerated for clarity. Actually the bulge is only a few thousandths inch.

Still referring to FIGS. 3 and 4, the opposite sides of each bearing unit spoke 94 are formed with arcuate grooves 94a adjacent hub 92, all of the grooves together at each side of the bearing unit forming a circle around the hub. Thus each bearing unit spoke is laterally necked down adjacent the hub 92 so that each spoke 94 can flex laterally relative to the other spokes in the directions of the doubleheaded arrow A in FIG. 4, i.e. in a plane which includes the rotary axis of the bearing unit 16. The bearing unit hub and spokes are made of a material such as steel with a suitable modulus of elasticity so that each spoke 94 is fairly flexible and resilient so that when a given spoke is deflected laterally by an amount not exceeding its spring constant, the spoke tends to return to its normal unstressed position illustrated in FIG. 4.

However while each spoke is flexible and resilient in the lateral direction, it is quite stiff in the circumferential direction, i.e. around the unit, because of its relatively long arcuate boundary with hub 92. Such stiffness is required because any appreciable amount of deflection in that direction would cause a retardation of motion and thus drive the load nonuniformly. Thus the spokes 94 and the rollers 98 rotatively secured to the ends of those spokes are designed ideally to have but a single degree of freedom, namely, laterally in a plane which includes the bearing unit axis.

As best seen in FIG. 4, a sleeve 108 is rotatively secured within hub 92 by way of circular bearing units 116. Sleeve 108 has a central opening 114 having a square cross-section which is arranged and adapted to receive ring 18 so that the sleeve 108 is rotatively fixed to the ring.

Refer now to FIG. 5 of the drawings which shows diagrammatically the various positions of the bearing unit teeth 43 of a typical such unit relative to the worm and stator groove walls. In FIG. 5, the worm 11 is represented in profile, while the stator grooves 36 are shown from a different direction to show their lead angle. When all of the bearing units 16 are mounted on ring 18 and the two housing sections 22a and 22b are secured together as shown in FIG. 1, at least one tooth 43 (or more particularly its roller 98) of each bearing unit usually engages the side wall of a stator groove. Depending upon the manufacturing tolerances or dimensional aberrations of the transmission parts, other teeth of each bearing unit rest at varying distances near the walls of their respective stator grooves. Likewise one or two rollers of each bearing unit may sit at or near the walls of the grooves in the drive worm 11. In that figure it is seen that while the tooth 43C properly engages the wall of the stator groove 36C, the teeth 43A and 43B above it are spaced away from their corresponding groove walls 36A and 36B by different amounts E. Likewise the tooth 43D below the engaging tooth is spaced from the wall of its groove 36D.

In like fashion, the two lowermost teeth 43E and 43F which are disposed opposite the worm 11 are spaced away from the walls of the grooves in which they ride by different amounts E.

In other words, to have more than one tooth pair properly engaged in their grooves at any given time under this no-load condition would require essentially zero dimensional aberration at all load carrying surfaces of the transmission. Since that degree of perfection is impossible to attain as a practical matter, the various teeth on a typical bearing unit 16 are usually spaced away from those ideal points of engagement by varying amounts E as shown in FIG. 5. Of course, the teeth 43 on the various other bearing units 16 are likewise variously positioned from their ideal points of contact with their respective groove walls.

Thus when the input shaft 12 is turned, say clockwise, as viewed in FIGS. 1 and 5, the worm 11 exerts a drive force D downward against the teeth 43E and 43F disposed opposite the worm. Since the spokes 94 of each bearing unit 16 are rigid in the circumferential direction, that drive force D is immediately reflected in a rotation of each bearing unit, including all of its teeth 43 about ring 18. Of course, if the spokes were flexible in that direction there would be an undesirable retardation of the rotary motion of each bearing unit creating significant nonconformity of motion of ring 18 and output shaft 24. Since only one or a few of the teeth 43A to 43D engage the walls of their respective stator grooves 36 when there is little or no load on the transmission output shaft 24, only those engaging teeth, e.g. tooth 43C, carry the thrust load L.

However, when the load L on the output shaft 24 increases and the input torque attains peak design values, the resilient spoke 94 comprising the engaging tooth, i.e. tooth 43C in FIG. 5, deflects elastically sideways or laterally until another tooth, e.g. tooth 43B, engages its groove wall. Then the spoke 94 forming that tooth deflects in the same fashion until the next and all of the remaining teeth 43 deflect as needed to contact their respective guide surfaces or walls and thus share the thrust load L. At that point, substantially all of the teeth 43 have assumed new lateral positions within a precalculated elastic range R of the resilient bearing unit spokes 94. Thus with the flexing of all of the bearing units 16 in the same fashion, all dimensional aberrations or errors E between the various teeth 43 and the walls of the corresponding worm and stator grooves are compensated for. It is of great significance that because of the selective elasticity of the units 16, these deflections are attained while actually increasing the overall efficiency of the transmission because, now, inevitably all the bearing units 16 share the load equally.

A somewhat different type of bearing unit 109 is shown in FIG. 7. It has the form of a star or spider 110 with arms 110a terminating in the rollers 98. Arms 110a are similar to the spokes 94 in that they are stiff in the direction around the unit due to their triangular shape, but elastic in the lateral direction because of their relative thinness. This bearing unit has the same advantages as the unit 16 described above.

With all of the units 16 (or 109) sharing the load, the condition for equalization of stresses may be calculated. More particularly, the force F1 on worm 11 for a given input torque $T_{in}$ may be expressed as follows:

$$F_1 = \frac{T_{in}}{nbr_1} \quad (2)$$

where:
$r_1$ = effective radius of worm
$b$ = number of teeth engaging worm,
$n$ = number of bearing units, and
$T_{in}$ = input torque The force F1, in turn, gives rise to a force F2 (FIG. 3) on each bearing unit tooth which may be represented as follows:

$$F_2 = \frac{F_1}{\tan\alpha} = \frac{T_{in}}{nbr_1\tan\alpha} \quad (3)$$

where:
$\alpha$ = worm groove pitch

The force F2 causes the bearing units to advance along the stator grooves with a mean lead angle $\beta$ which induces a third force F3 (FIG. 3) at each tooth directed along the bearing unit axis which may be expressed as follows:

$$F_3 = \frac{bF_2}{a\tan\beta} = \frac{bT_{in}}{bnar_1\tan\alpha\tan\beta} \quad (4)$$

where:
$a$ = number of teeth engaging stator, and
$\beta$ = lead angle of stator grooves
which can be equated with $T_{in}$ in the following manner:

$$T_{out} = \frac{T_{in}r_3na}{nbr_1\tan\alpha\tan\beta} \quad (5)$$

whereby n disappears and only the ratio of the radii and the ratios of the engaged teeth remain, with the most dominant factor being the product of the tangents of the lead angles $\alpha$ and $\beta$. It is most important to note that due to my new discovery, said lead angles are no longer constrained by the requirement to bring about the return of the same tooth to the same groove within one revolution of the output shaft. Thus wide ranges of ratios and torques have now become attainable. The output torque $T_{out}$ is generated by the forces F3 for all of the bearing units and may be represented by the expression:

$$T_{out} = \Sigma F_3 \times r_3 = nar_3F_3 \quad (6)$$

where:
$r_3$ = distance of axes of planets and worm

The forces F1 to F3 all cause stresses which, in turn, limit the lift of the transmission and determine its overall size and weight. Ideally to achieve long life with minimum size, those forces from Equations 2, 3 and 4, should relate as follows:

$$\frac{F_1}{\sin\alpha} \approx \frac{F_2}{\sin\beta} = \frac{F_3}{\cos\beta} \tag{7}$$

and due to the selective elasticity of the bearing units 16 those stresses are distributed uniformly around those units because each tooth deflects by an amount d which may be represented as:

$$d = lEF_3 \tag{8}$$

where:
l = length of bearing unit tooth,
E = modulus of elasticity of tooth, and
F3 = thrust force on that tooth Thus by properly choosing the values of $I_w$ (the ratio of the number of bearing unit teeth to the number of worm grooves) and $I_r$ (the ratio of the number of static grooves to the number of bearing unit teeth) together with a, b and n to achieve as closely as possible the aforesaid stress equality one can optimize the compactness of the transmission and minimize its size, weight and cost for a given application. With such load equalization, the stress at each bearing unit tooth, or more particularly its contact point with its stator groove, under a given force F3 is a minimum.

As noted above, preferably, though not necessarily, the worm grooves 11a and stator grooves 36, have a generally rectangular cross-section for snugly receiving the bearing unit teeth 43, or more particularly, their rollers 98. Furthermore, the roller exterior surfaces 98a are slightly barrel-shaped. This shape is chosen for several reasons. First, and referring to FIG. 6A, when the bearing unit teeth are in the form of balls and the stator grooves have a round or gothic arch profile as they do in my prior transmission, the thrust force F3 is applied through the bearing unit U to ball B at point P. That force may be resolved into a component Fc extending in a direction from point P through point C where the ball actually contacts the stator S. The other component of force F3, ie. Fr, is directed radially inward toward worm 11 tending to push the balls out of the stator grooves. That force tends to squeeze the bearing unit U against the worm 11 and impose useless structural stresses on the various parts such as the worm, the ring 18 and the bearing unit cages. It also limits the load carrying capability of the transmission.

The round tooth shape also produces excessively high Hertz pressures at the points of contact between the teeth and their respective groove walls, which, aside from creating unwanted parts deformation, causes breakdown of the lubrication film at those points and thus promotes excessive parts wear.

The utilization of barrel-shaped teeth or rollers on the bearing units and rectangular grooves as taught herein, on the other hand, substantially eliminates those problems. As shown in FIG. 6B, the thrust force F3 now acts along a line defined by the center of the tooth and the point of contact C between the tooth and the groove side wall. As seen from that figure, there is no force component Fr tending to push the roller out of the groove. This means that there is no compression of the bearing units against the worm and minimal stress on, and deformation of, parts and less parts wear due to oil film breakdown. Moreover, for a given load, the Hertz pressure due to the thrust load F3 is much less for the FIG. 6B unit than for its FIG. 6A counterpart.

For a toroidal transmission of the advanced design disclosed herein, the tooth stress in terms of unit area pressure at the point of contact is characterized by an elliptical contact area between the barrel-shaped roller and the flat contact side of the stator groove. As stated previously, the barrel shape is minute and merely compensates for the lateral deflection of the planet gear arms under load. The area pressure, then, relates to the deformation of the roller and wall and may be expressed as:

$$\delta = \sqrt[3]{\frac{F_3}{\cos\beta} dE} \tag{9}$$

where:
E = Young's modulus of elasticity,
d = diameter of roller or ball, and
δ = deformation The equation 9 is essentially identical for both roller and ball tooth elements. In comparing the deformation effects between roller and ball, it becomes obvious immediately that the roller has a large dominant barrel radius besides its normal diameter which creates an effective mean value for d approximately 10 times larger than normal. When entered into equation 9, this means:

$$\delta_{roller} = \sqrt[3]{\frac{1}{10d}} \delta_{ball} = \tfrac{1}{2} \delta_{ball} \tag{10}$$

With the deformation of the barrel only about ½, the unit area pressures diminish quite rapidly and are therefore about 1/10 of the pressures or stresses on the ball for the same force F3.

In addition, the angle of contact in the ball version of the toroidal drive contains the problem of force amplification between ball and groove. More particularly, the force F3 creates a contact force Fc, as follows:

$$F_c = \frac{F_3}{\cos\beta\cos\gamma} \tag{11}$$

where:
β = lead angle of stator groove, and
γ = contact angle between bar and groove profile With a contact angle of 30°, the contact force Fc becomes over 30% larger than the original force F3. This is apparent from FIGS. 6A and 6B. The one third increase in force multiplied with the contact area stresses shows the profound superiority of the roller design over the ball design. This statement must be coupled with the problem of inherent inelasticity of the bearing unit ball assembly verses the deliberately elastic planet gears whose selectively flexible arms assure a uniform load distribution.

Assuming, for example, that due to materials selection, the Hertz pressure is limited to about 200 lbs/mm² which is equivalent to about 1.4 times the allowable stress, a transmission utilizing the FIG. 6A construction would have to be on the order of four times bigger and heavier to handle the same load. To put it another way, if the associated thrust were the same for both constructions, the Hertz pressures developed in the present transmission would be on the order of 40% less than in the prior one.

The illustrated shape of the rollers also makes the rollers relatively insensitive to the depths and diameters of the worm and stator grooves. It also assures that when the transmission is under load and the various spokes are deflected, the contact pitch lines of the rollers with the grooves walls will be uniform for all of the bearing units. With this arrangement, as experimentally proven in units actually manufactured, the output motion of the transmission is assuredly quiet, smooth and uniform.

In a given transmission, then, the elasticity of the spokes in the various bearing units 16 is calculated to achieve equal load sharing for, typically, 50% of the load on upwards to maximum load. The total amount of spoke deflection, shock absorption capability as well as the dynamic resonance properties of the transmission as a whole are taken into consideration when designing the transmission for a specific end use. The critical factor in any such design is that all teeth 43 must share additively in the total load when transmitting torque if the transmission is to be substantially smaller in size and weight than prior comparable mechanisms of this general type. Thus the planetary system in the transmission must be treated as an entire dynamic and kinematic system whose intrinsic elasticity is matched to the expected torque to accomplish the objectives of this invention. Following this approach, transmissions have actually been constructed which for the same torque and lifetime are on the order of only one-fifth the size and one-fifth the weight of prior transmissions having the same torque, load characteristics, and lifetime.

It should also be mentioned at this point that the various teeth in the bearing units can be preloaded so that they have zero backlash in the transmission. This can be accomplished simply by displacing some bearing units 16 along ring 18 using shims so that their added "windup" causes their rollers to engage the opposite sides of their respective grooves.

Further, other techniques may be employed to provide the teeth on the various bearing units with the requisite selective elasticity in the planes containing the bearing unit axis. For example, the spokes 94 may be rigid and bolts or pins 102 slidably received in slots or keyways 104 at the ends of the spokes which slots are elongated in the lateral direction. Then biasing means such as springs (not shown) may be positioned between the opposite ends of each slot and the pin to bias the pin toward the center of its slot so that the associated roller is normally maintained in a neutral position on the spoke. Then, when the unit is installed in the housing 22 and a torque is applied, the pins and rollers will deflect laterally as needed to distribute the load equally among all the bearing units as described above.

The principles described here are not limited in application to toroidal transmissions, but can be utilized in linear spindle drives in which the member supporting the bearing units is straight instead of being a ring 18. In this event, the races 36 would be formed on the inside wall of a tubular enclosure and the bearing units rotatively mounted on a shaft extending along the axis of the tube. The bearing units might then be driven as described above by an elongated spur gear extending parallel to the tube and engaging the bearing units through a lengthwise slit in the tube. Rotation of the bearing units would cause the shaft to advance along the tube-like enclosure. In the case of the linear drive, then, the axis of rotation R—R and the axis of translation T—T are the same. So too, these same principles can be applied to planetary gear elements, such as inverted ball bearings, in which the thrust load L is applied essentially perpendicular to the drive force F.

It will be seen from the foregoing, then, that there has been described herein a highly efficient transmission which is also quite accurate as a result of the above described special bearing units 16 which are composed of beams or spokes which are flexible and resilient in the lateral direction, but quite stiff in the circumferential direction. Using such units, a maximum amount of drive force can be coupled to the bearing units, while at the same time the bearing units can flex as needed to seat their teeth or rollers properly in the various grooves in which they roll so that the transmission load is shared equally among the various bearing units. Thus the transmission comprises a complete kinematic/dynamic system whose elasticity is tailored specifically to respond to intrinsic manufacturing tolerances of the transmission and to the extrinsic characteristics of the torque load.

The transmission made in accordance with my invention can handle uniform or nonuniform loads with equal ease. Further it can operate at high speeds even under heavy loads in both forward and reverse directions. By virtue of its efficient use of bearing surfaces and the equalization of the load throughout its bearing parts, the present transmission has a very large power-to-size ratio and it can be used either as a speed increaser or reducer at a variety of gear ratios. Consequently, the transmission constitutes a definite innovation in the planetary gear and transmission art. Finally, because of the realization that no special relationship need be maintained between the groove and gear tooth pitches, a wide variety of reduction ratios are available simply by changing the stator enclosure 37. Likewise, the same basic transmission unit can be tailored to different torque-carrying requirements for different applications by substituting sets of bearing units having different elastic properties. These features greatly reduce the parts inventory which must be maintained for differently rated transmissions.

It will thus be seen that the objects set forth above among those made apparent from the preceding description are efficiently attained, and, since certain changes may be made in the above construction and combination of steps without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described.

What is claimed as new and desired to be secured by Letters Patent of the United States is:

1. A mechanical transmission of the type including one or more helix-like races defining a plurality of race convolutions having a common axis of rotation, a support member extending along the axis, at least one bearing unit axially fixed to the support member and with its periphery positioned in rolling engagement with the race convolutions, and means for rotating each bearing unit about said axis whereby each bearing unit rolls along the race convolutions and the support member advances along said axis, the improvement wherein each bearing unit comprises A. a hub,
B. a circular array of tooth means located radially outward from the hub, each tooth means engaging in a different race convolution, and C. means for connecting each tooth means to the hub so that each tooth means is resiliently displaceable independently of the other tooth means in the direction along said axis of rotation, but not circumferentially around the hub so that when the transmission is placed under load, each tooth is displaced in said direction as necessary to distribute said load uniformly among all the bearing units.

2. The transmission defined in claim 1 wherein each connecting means comprises a radial spoke.

3. The transmission defined in claim 2 wherein each spoke is wedge-shaped in the circumferential directions and is laterally necked down near the hub so that the free end portion of the spoke is somewhat flexible and resilient in the lateral directions, but relatively stiff in the circumferential directions.

4. The transmission defined in claim 2 wherein each tooth means comprises
   A. a roller, and
   B. means for securing each roller to the free end of a spoke.

5. The transmission defined in claim 4 wherein
   A. the exterior surface of each roller is slightly barrel-shaped, and
   B. each helical race has a generally rectangular cross-section.

6. The transmission defined in claim 3 and further including means for shifting a bearing unit along the support member so as to dispose at least some of the teeth of said unit along said axis of rotation so that there is substantially zero backlash when said bearing unit is rotated.

7. The transmission defined in claim 1 wherein
   A. each said race convolution has a generally rectangular cross-section, and
   B. each tooth means comprises a roller which engages in said race convolution.

8. The transmission defined in claim 7 wherein the exterior surface of each said roller is slightly barrel-shaped.

9. The transmission defined in claim 1 and further including means for displacing at least some of said teeth of a said unit along said axis of rotation so that when said bearing unit is rotated there is substantially no backlash between said unit and said race convolutions.

10. The transmission defined in claim 1 wherein said transmission has a single race in the form of a toroid having a multiplicity of turns so that the race convolutions are interlaced, the wall thickness between the end of the last race convolution and the beginning of the first race convolution being equal to the wall thickness between the remaining adjacent convolutions in said race.

11. The transmission defined in claim 10 wherein the width of said wall thickness is different from the width of said race.

12. A mechanical transmission comprising
   A. means defining one or more helix-like races,
   B. a planetary gear element including
      (1) a hub having a longitudinal axis,
      (2) a circular array of teeth positioned radially outward from the hub, and
      (3) means for separately connecting each tooth to the hub, and
   C. means for rotatively positioning the gear element relative to said race defining means so that said teeth engage in and move along said one or more races when said gear is rotated, each connecting means being
      (1) fixed to the hub in the circumferential direction around the tooth array, but
      (2) resiliently displaceable in a plane which includes the longitudinal axis of the hub so as to compensate for dimensional differences and abberations when said gear element is rotated relative to said race defining means so that the transmission load is shared substantially equally among all of the engaging teeth in the gear element.

13. A mechanical transmission comprising
   A. means defining one or more helix-like races,
   B. an input shaft,
   C. an output shaft, and
   D. one or more gears rotatively mounted to transmit rotary motion between the two shafts, each gear having a circular array of teeth, said teeth being
      (1) engaged in said one or more races,
      (2) stiff in the circumferential directions around the tooth array, but
      (3) resiliently displaceable in planes which include the rotary axis of the gear, said resiliency being selected so that when one of said shafts is rotated and the other of said shafts is under a torque load, the transmission has an intrinsic elasticity tailored to the manufacturing tolerances of its internal parts and the extrinsic characteristics of the torque load so that the transmission load is shared substantially equally among all of the engaging teeth in each gear.

14. The method of making a mechanical transmission of the type having means defining a helix-like race, an input shaft, an output shaft, and one or more gears rotatively mounted to transmit rotary motion between the two shafts comprising the steps of forming each gear with a circular array of teeth engaged in said one or more races and which are
   A. stiff in the circumferential directions around the tooth array, but
   B. resilienty displaceable in planes which include the rotary axis of the gear, and
   C. selecting said resiliency so that when one of said shafts is rotated and the other of said shafts is under a torque load, the transmission has an intrinsic elasticity tailored to the manufacturing tolerances of its internal parts and the extrinsic characteristics of the torque load so that the transmission load is shared substantially equally among all of the engaging teeth in each gear.

15. The method of making a mechanical transmission of the type including a helix-like race having an axis of rotation a support member extending along the axis, at least one rotary bearing unit axially fixed to the support member and with its periphery positioned in rolling engagement with the race and a gear for rotating each bearing unit about said axis of rotation, comprising the steps of forming each bearing unit with a circular array of independent teeth each of which is
   A. stiff in the circumferential directions around the periphery of the unit, but
   B. relatively elastic in the planes which include said axis of rotation so that each tooth can be resiliently deflected in a said plane independently of the other teeth.

16. The method defined in claim 15 wherein the elasticities of the teeth are tailored specifically to respond to the intrinsic manufacturing tolerances of the transmission parts and the extrinsic characteristics of the torque load on said shaft.

17. The method of making a mechanical transmission of the type including one or more helix-like races defining a plurality of race convolutions having a common axis of rotation, a support member extending along said axis, at least one planet gear axially fixed to the support member with its teeth positioned in rolling engagement with the race convolutions and a worm for rotating said gear about said axis so that the gear revolves about the worm axis comprising the steps of varying the number of race convolutions or worm threads in a manner which need not be a multiple of the number of teeth on the planet gear for each revolution of the planet gear about the worm axis, while varying the wall thickness between the race convolutions without changing the race, worm or planet gear diameters.

18. The method defined in claim 17 and including the additional step of shifting a bearing unit along the support member so as to displace at least some of the teeth of said gear along said axis of rotation so that there is substantially no backlash when said gear is rotated.

* * * * *